United States Patent
Tani et al.

(10) Patent No.: US 7,878,051 B2
(45) Date of Patent: Feb. 1, 2011

(54) LIQUID FLOW MEASUREMENT APPARATUS AND METHOD UTILIZING A BUBBLE IN A PASSAGE

(75) Inventors: Hiroki Tani, Kariya (JP); Makoto Yamaguchi, Kariya (JP); Shinichi Kaibuki, Kariya (JP); Tetsuji Kudoh, Kariya (JP)

(73) Assignee: Denso Corporation, Kariya (JP)

( * ) Notice: Subject to any disclaimer, the term of this patent is extended or adjusted under 35 U.S.C. 154(b) by 439 days.

(21) Appl. No.: 12/164,543

(22) Filed: Jun. 30, 2008

(65) Prior Publication Data

US 2009/0013767 A1    Jan. 15, 2009

(30) Foreign Application Priority Data

Jul. 11, 2007    (JP) .............................. 2007-182280

(51) Int. Cl.
G01M 19/00 (2006.01)
G01F 1/38 (2006.01)
G01M 3/08 (2006.01)

(52) U.S. Cl. ...................... 73/114.48; 73/861.47; 73/46

(58) Field of Classification Search .............. 73/864.47, 73/114.48, 114.45, 46
See application file for complete search history.

(56) References Cited

U.S. PATENT DOCUMENTS

| 6,062,067 A | 5/2000 | Schoeffel et al. |
| 7,080,551 B2 * | 7/2006 | Tani et al. ................ 73/114.52 |
| 2006/0179921 A1 | 8/2006 | Winkler et al. |

FOREIGN PATENT DOCUMENTS

| JP | 55-177654 | 12/1980 |
| JP | 62-167901 | 7/1987 |
| JP | 4-332820 | 11/1992 |
| JP | 6-40722 | 5/1994 |
| JP | 7-119585 | 5/1995 |
| JP | 8-43241 | 2/1996 |
| JP | 8-305852 | 11/1996 |
| JP | 2000-280568 | 10/2000 |
| JP | 2004-45249 | 2/2004 |
| JP | 2004-270562 | 9/2004 |

OTHER PUBLICATIONS

Japanese Office Action dated Jun. 2, 2009, issued in corresponding Japanese Application No. 2007-182280, with English translation.

* cited by examiner

Primary Examiner—Hezron Williams
Assistant Examiner—Nathaniel Kolb
(74) Attorney, Agent, or Firm—Nixon & Vanderhye PC

(57) ABSTRACT

A liquid measurement apparatus is configured to measure an amount of liquid flowing from a measured object. The apparatus includes a passage member having a measurement passage being connected to the measured object at one end. The measurement passage is filled with liquid. The apparatus further includes a closed vessel, which is connected to an other end of the measurement passage and filled with saturated vapor of the liquid. The apparatus further includes an analyzer. The liquid filled in the measurement passage contains a bubble, which is movable in accordance with change in amount of the liquid in the measurement passage. The analyzer is configured to calculate a travel distance of the bubble and configured to measure the amount of the liquid flowing from the measured object based on the calculated travel distance.

12 Claims, 4 Drawing Sheets

LIQUID FLOW MEASUREMENT APPARATUS AND METHOD UTILIZING A BUBBLE IN A PASSAGE

CROSS REFERENCE TO RELATED APPLICATIONS

This application is based on and incorporates herein by reference Japanese Patent Application No. 2007-182280 filed on Jul. 11, 2007.

FIELD OF THE INVENTION

The present invention relates to a liquid measurement apparatus and a method for measuring liquid.

BACKGROUND OF THE INVENTION

For example, U.S. Pat. No. 7,080,551 B2 (JP-A-2005-172735) discloses a liquid measurement apparatus, which measures an amount of liquid flowing from a measured object such as an injector so as to check leakage of liquid from the measured object. The liquid measurement apparatus has a measurement passage, which is connected at one end with the measured object and filled with a test liquid A bubble is injected in the test liquid such that the bubble is movable in the measurement passage depending on change in amount of the test liquid in the measurement passage. The liquid measurement apparatus obtains images by photographing the bubble using a camera so as to acquire change in position of the bubble based on the images. Whereby, the liquid measurement apparatus measures the amount of liquid flowing from the measured object. Furthermore, in the liquid measurement apparatus, a diaphragm is provided in the measurement passage, so that the maximum travel distance of the bubble due to change in amount of liquid is limited to restrict the bubble from being deviated from a measurable range.

However, when such a liquid measurement apparatus is used over a long period, the test liquid increasingly vaporizes through an open end of the measurement passage, and consequently the bubble is gradually shifted toward the diaphragm. Therefore, the test liquid is repeatedly filled, and the bubble is also repeatedly injected in a relatively short period. Moreover, when vibration is applied to the liquid measurement apparatus, or environmental change such as temperature change occurs during the measurement, the bubble position may be shifted. As a result, measurement accuracy is impaired.

SUMMARY OF THE INVENTION

In view of the foregoing and other problems, it is an object of the present invention to produce a liquid measurement apparatus being capable of measuring an amount of liquid flowing from a measured object without repeating filling of a test liquid and injection of a bubble in a short period. It is another object to produce a method for accurately measuring an amount of liquid flowing from a measured object even when vibration is applied.

According to one aspect of the present invention, a liquid measurement apparatus for measuring an amount of liquid flowing from a measured object, the liquid measurement apparatus comprises a passage member having a measurement passage being connected to the measured object at one end, the measurement passage being filled with liquid. The liquid measurement apparatus further comprises a closed vessel connected to an other end of the measurement passage and filled with saturated vapor of the liquid. The liquid measurement apparatus further comprises an analyzer. The liquid filled in the measurement passage contains a bubble, which is movable in accordance with change in amount of the liquid in the measurement passage. The analyzer is configured to calculate a travel distance of the bubble and configured to measure the amount of the liquid flowing from the measured object based on the calculated travel distance.

According to another aspect of the present invention, a liquid measurement apparatus for measuring an amount of liquid flowing from a measured object, the liquid measurement apparatus comprises a passage member having a measurement passage being connected to the measured object at one end. The liquid measurement apparatus further comprises a diaphragm provided in the measurement passage to partition the measurement passage into a measured-object side passage and an observation passage, the measured-object side passage being connected with the measured object and filled with test liquid, the diaphragm being configured to change in shape in accordance with change in amount of the test liquid in the measured-object side passage. The liquid measurement apparatus further comprises an analyzer. The observation passage is filled with high-boiling liquid, which is substantially non-vaporizing at a measurement environment and contains a bubble, which is movable in the observation passage in accordance with change in shape of the diaphragm. The analyzer is configured to calculate a travel distance of the bubble and configured to measure the amount of liquid flowing from the measured object based on the travel distance.

According to another aspect of the present invention, a liquid measurement apparatus for measuring an amount of liquid flowing from a measured object, the liquid measurement apparatus comprises a passage member having a measurement passage being connected to the measured object at one end, the measurement passage being filled with liquid. The liquid measurement apparatus further comprises a camera configured to successively photograph the measurement passage to obtain a plurality of measured images. The liquid measurement apparatus further comprises an analyzer. The liquid filed in the measurement passage contains a bubble, which is movable in the measurement passage in accordance with change in amount of liquid in the measurement passage. The analyzer is configured to obtain positions of the bubble on at least three of the plurality of measured images. The analyzer is configured to perform a linear approximation of a relationship between elapsed time and the travel distance of the bubble from the obtained positions of the bubble thereby to calculate a unit-time travel distance of the bubble per unit time. The analyzer is configured to measure the amount of liquid flowing from the measured object in a predetermined period based on the unit-time travel distance.

According to another aspect of the present invention, a method for measuring an amount of liquid flowing from a measured object, the method comprises obtaining at least three measured images by photographing a bubble, which is contained in liquid filled in a measurement passage, the measurement passage being connected to the measured object at one end, the bubble being movable in the measurement passage in accordance with change in amount of liquid in the measurement passage. The method further comprises calculating positions of the bubble on the at least three measured images. The method further comprises performing a linear approximation of a relationship between elapsed time and a travel distance of the bubble from the positions of the bubble thereby to calculate a unit-time travel distance of the bubble per unit time.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Hereinafter, a liquid measurement apparatus according to the embodiment is described in detail with reference to drawings. The liquid measurement apparatus is configured to measure an amount of liquid flowing from a measured object, which is an object to be measured within a predetermined period. For example, the measured object includes an injector for a gasoline engine or a diesel engine, and the liquid measurement apparatus measures an amount of leakage from a seat portion in a period when a valve of the injector is closed.

Figure 1:
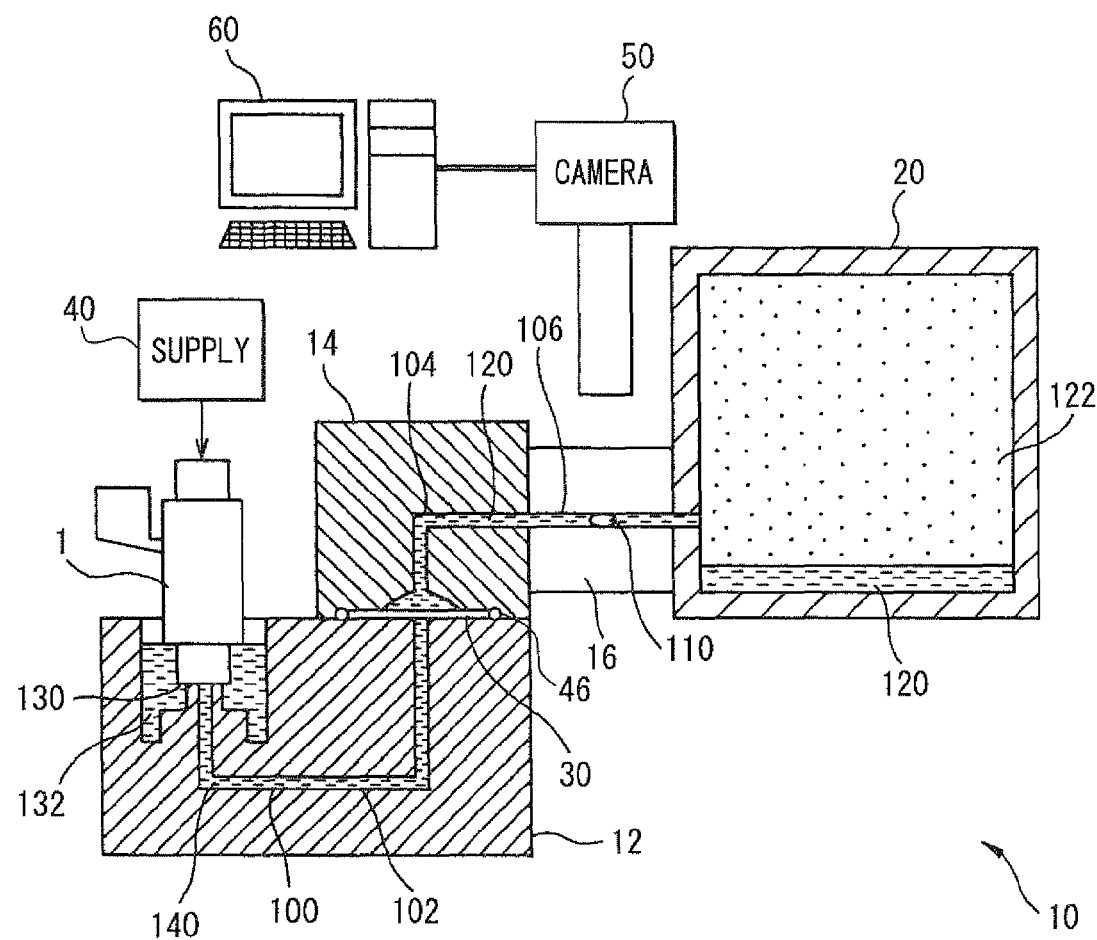
FIG. 1 is a schematic diagram showing a liquid measurement apparatus according to an embodiment.

As shown in FIG. 1, a liquid measurement apparatus 10 has passage members 12, 14, and 16, a closed vessel 20, a diaphragm 30, a liquid supply unit 40, a camera 50, and an analyzer 60. The passage members 12, 14, and 16 together define a measurement passage 100. The measurement passage 100 includes a measurement passage 102 formed in the passage member 12, a measurement passage 104 formed in the passage member 14, and a measurement passage 106 formed in the passage member 16. The measurement passage 102 is filled with a test liquid 140 in order to measure an amount of liquid leaking from the injector 1. A connecting member 130 is provided at one end of the measurement passage 102. The connecting member 130 is attached with the injector 1. The passage member 12 has a tank 132 for storing the test liquid 140 around the connecting member 130, and the tank 132 is filled with the test liquid 140. The connecting member 130 is sunk in the test liquid 140 stored in the tank 132, so that air is restricted from flowing into the measurement passage 100 through the connecting member 130.

The measurement passages 104 and 106 together form an observation passage for observing a position of a bubble 110. Moreover, the measurement passages 104 and 106 are filled with a liquid 120 having a high boiling point, so that the liquid does not vaporize at a measurement environment. The high-boiling liquid may be silicone oil, for example. The measurement passage 106 is connected to the closed vessel 20 at one end. The closed vessel 20 is filled with the high-boiling liquid 120 and saturated vapor 122 thereof to restrict vaporization of the high-boiling liquid 120 through the measurement passages 104 and 106.

Moreover, a bubble 110 formed of air is injected in the high-boiling liquid 120 filled in the measurement passages 104 and 106. Furthermore, the passage member 16 defining the measurement passage 106 is formed from a light-transmitting material such as glass or transparent plastic, so that the bubble 110 can be observed from the outside of the passage member 16. The measurement passage 106 has a circular section. The diameter of the measurement passage 106 is preferably set to be, for example, 1 mm or less, so that the bubble 110 isolates the high-boiling liquid 120 at the side of the measurement passage 104 and the high-boiling liquid 120 at the side of the closed vessel 20. Furthermore, as the diameter of the measurement passage 106 is decreased, a travel distance of the bubble 110 is increased with respect to the amount of liquid flowing from the injector 1, therefore the amount of liquid can be accurately detected. The minimum of the diameter of the measurement passage 106 is determined by the minimum of passage diameter at which the bubble 110 can move through the measurement passage 106. Even when the passage diameter is several micrometers, the bubble 110 may be capable of moving through the measurement passage 106.

The diaphragm 30 is, for example, formed of a metallic diaphragm, and held between the passage members 12 and 14. The diaphragm 30 partitions the measurement passage 100 into the measurement passage 102 at the side of the fuel injection valve 1 and the measurement passages 104 and 106 at the side of the bubble 110. A gap between the diaphragm 30 and the passage members 12 and 14 is sealed by an O ring 46 so as to restrict leakage of liquid from the measurement passage 104 into the measurement passage 102. Therefore, the passage 100 can be filled with different liquids separately between the measurement passage 102 and the measurement passages 104 and 106. The diaphragm 30 deforms depending on the amount of the test liquid 140 flowing into the measurement passage 102. Specifically, when pressure applied to the diaphragm 30 from the test liquid 140, which is filled in the measurement passage 102, is balanced to pressure applied from pressure of the high-boiling liquid 120 filled in the measurement passage 104, the diaphragm 30 has an approximately planar shape, and is latched by the passage member 12. In the present condition, the diaphragm 30 is in a reference position. As the amount of the test liquid 140 flowing from the injector 1 into the measurement passage 102 is increased, the diaphragm 30 is bent toward the measurement passage 104, so that the volume inside of the measurement passage 104 is decreased correspondingly to the increased amount of the test liquid 140. With such decrease in volume, the high-boiling liquid 120 in the measurement passage 104 moves toward the measurement passage 106, and hence the bubble 110 injected in the measurement passage 106 also moves toward the closed vessel 20. The passage member 14 has a concave portion that has a concave curved surface at an end of the measurement passage 104, and the concave portion defines a liquid chamber. The diaphragm 30 is latched by the end face of the passage member 12 and the concave portion, and thus restricted in displacement. In addition, the diaphragm 30 is located at a position higher than a position of a surface of the liquid in the connecting member 130 of the injector 1. The level of the diaphragm 30 is set high, thereby locating the diaphragm 30 in the reference position when the test liquid 140 does not leak from the injector 1.

Connecting portions between the components are sealed to restrict leakage of the test liquid 140 and the high-boiling liquid 120 while the injector is mounted. The liquid supply unit 40 supplies the test liquid 140 into the injector 1 by applying predetermined pressure to the test liquid 140 during the measurement. Since various devices, including a known unit that supplies liquid by pressurizing the liquid, can be used for the liquid supply unit 40, detailed description of the unit is omitted here.

The camera 50 has a two-dimensional detector such as a CCD or a C-MOS sensor, and an optical system that forms an image of an object on the two-dimensional detector, and takes photographs of the bubble 110 in the measurement passage 106 at predetermined time intervals such as intervals of 100 msec. The camera 50 obtains the measurement images of the bubble 110. The obtained measurement images are sequentially transmitted to the analyzer 60. The camera 50 is configured such that each of the measurement images has a resolution at which a configuration of a boundary between the bubble 110 and the high-boiling liquid 120 can be recognized. Specifically, for example, the inner diameter of the measurement passage 106 has a width corresponding to about 100 pixels on each measurement image.

The analyzer 60 includes, for example, a personal computer (PC) having an arithmetic unit, a storage, and peripheral devices such as a display device and a keyboard, and a computer program running on the PC. The analyzer 60 detects a position of the bubble 110 in each of the measurement images received from the camera 50, thereby obtaining a travel distance of the bubble 110 from the detected positions of the bubble 110 per unit time, thereby to measure the amount of liquid flowing from the injector 1. Moreover, the analyzer 60 may be used as a controller for controlling the liquid supply unit 40.

Figure 2:
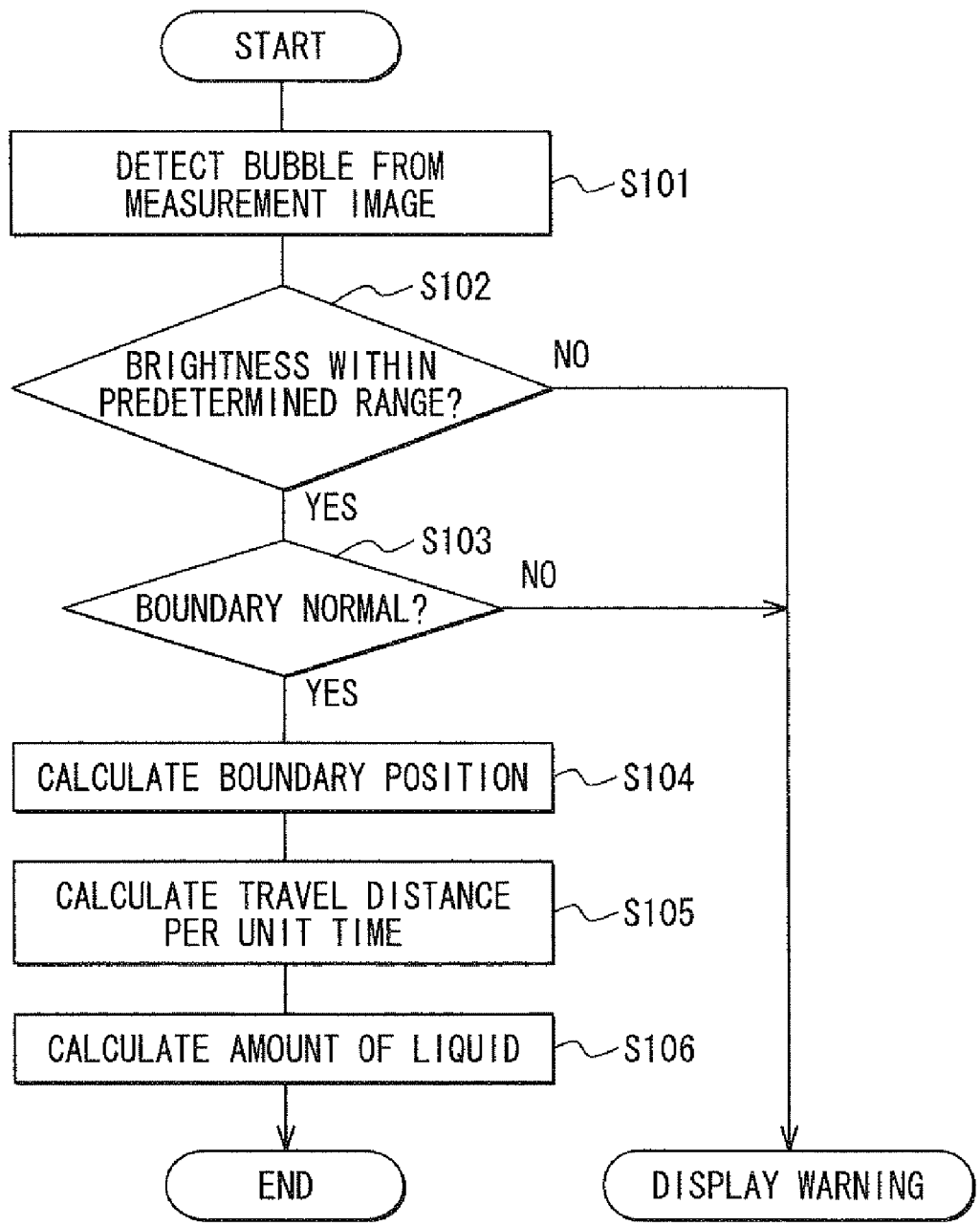
FIG. 2 is a flowchart showing a measurement of an amount of liquid flowing from an injector.

The analyzer 60 conducts a measurement of the amount of liquid, which flows from the injector 1, by performing the procedure shown in FIG. 2. First, at step S101, the analyzer 60 detects the bubble 110 on the basis of each of the measurement images received from the camera 50. On the measurement image, brightness is different between the region corresponding to the bubble 110 and the region corresponding to the high-boiling liquid 120. Thus, for example, the analyzer 60 binarizes, i.e., digitizes the region corresponding to the measurement passage 106 by comparing the measurement image with a predetermined threshold to extract a high-brightness region, whereby the analyzer can detect the region corresponding to the bubble 110. As the predetermined threshold, for example, an average brightness value of pixels within the region corresponding to the measurement passage 106 may be used. On a binarized image obtained by binarizing the measurement image, each of pixels within the region corresponding to the bubble 110 has a value of 1, and each of pixels other than the pixels of the bubble 110 has a value of 0.

Next, at step S102, the analyzer 60 calculates an average brightness value Bav of the region corresponding to the bubble 110, and determines whether the value is within a predetermined brightness range. The predetermined brightness range is set beforehand at a range having a certain brightness width. The center of the certain brightness width is assumed to approximately correspond to average brightness of the region corresponding to the bubble 110 on a measurement image, the measurement image being acquired in the case that the bubble 110 is normally formed without containing a foreign substance. The range is experimentally or experientially determined to be a range, in which the bubble 110 is considered to be normal. In step S102, when the average brightness value Bav is out of the predetermined brightness range, the analyzer 60 terminates the measurement, since the bubble 110 may not exist, or the bubble may contain a foreign substance at high possibility. In this case, the analyzer 60 may display a warning message using a display device or the like so as to indicate that the measurement is terminated. Preferably, the analyzer 60 may indicate a presumed reason why the measurement is terminated.

Figure 3A:
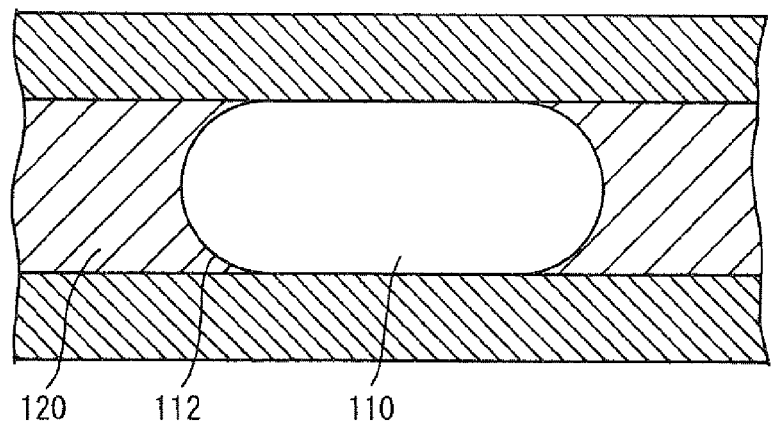
FIG. 3A is a schematic view showing a boundary of a bubble in a normal condition.
Figure 3B:
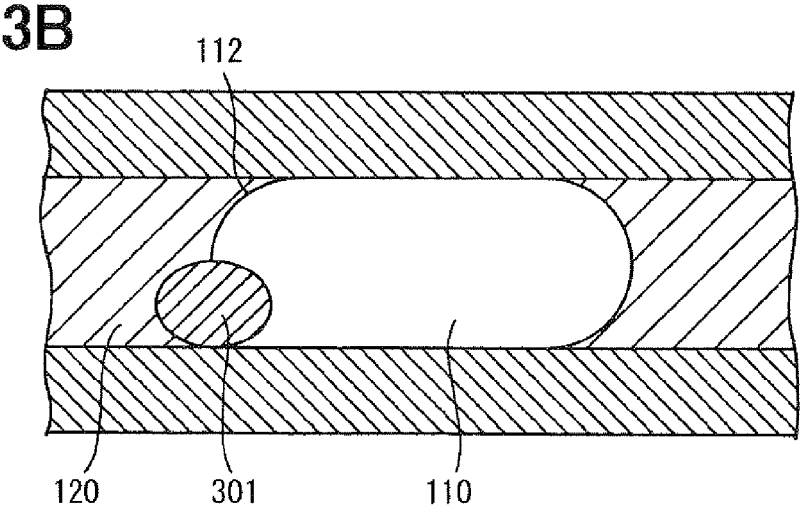
FIG. 3B is a schematic view showing the boundary of the bubble in a condition where a foreign substance exists in the vicinity of the bubble.

On the other hand, when the average brightness value Bav is within the predetermined brightness range, the routine proceeds to step S103. At step S103, the analyzer 60 compares a measurement configuration of a boundary between the bubble 110 and the high-boiling liquid 120 on each measurement image with a normal configuration of a boundary between the bubble 110 and the high-boiling liquid 120 when the bubble 110 is normal. In such a manner, the analyzer 60 determines whether the bubble 110 is normal. The present measurement and determination are described with reference to FIGS. 3A, 3B in further detail. As shown in FIG. 3A, when the bubble 110 is normal, a boundary 112 between the bubble 110 and the high-boiling liquid 120 is formed in a spherical shape. In this case, the boundary 112 is approximately arcuate on the measurement image. On the contrary, when a foreign substance 301 exists near the bubble 110, the boundary 112 is formed on a border between the foreign substance 301 and the bubble 110. In this case, the boundary 112 has a shape depending on the outline of the foreign substance 301 on the measurement image.

Thus, the analyzer 60 can determine whether the bubble 110 on the measurement image is a normal bubble by using an image processing such as a template matching. When the template matching is used, a template showing a shape of the normal bubble 110 is prepared beforehand, and stored in the storage of the analyzer 60. The template is, for example, a binary image in which each of pixels within the region corresponding to the bubble 110 has a value of 1, and each of pixels other than the pixels has a value of 0. The analyzer 60 performs a pattern matching between the binary data of the measurement image and the template. Thus, the analyzer 60 calculates coincidence between the measurement image and the template. The coincidence is obtained, for example, as a ratio of the number of coinciding pixels of the binary measurement image to the total number of pixels of the template. Here, the coinciding pixels coincide with the corresponding pixels of the template. When the region corresponding to the bubble 110 perfectly coincides with the template, the coincidence is 1. When the coincidence is less than a predetermined threshold such as 0.9, the analyzer 60 terminates the measurement.

Similarly, when the surface of the measurement passage 106 is adhered with a foreign substance or fogged, the boundary of the bubble 110 is partially or entirely hidden. In this case, the analyzer 60 determines that the bubble on the measurement image is not normal, and hence the analyzer 60 terminates the measurement. The analyzer 60 may determine whether the bubble 110 on the measurement image is normal according to another method. For example, the analyzer 60 may detect multiple boundary pixels on the boundary 112 by performing a difference operation between neighborhood pixels, thereby obtaining total number of boundary pixels on a predetermined arc, which is in advance obtained from the normal bubble 110. When the total number is less than a predetermined threshold, the analyzer 60 may determine that the bubble 110 on the measurement image is not normal.

On the other hand, when the coincidence is the predetermined threshold or more in step S103, the analyzer 60 calculates the position of the boundary 112 at step S104. In the present embodiment, the position of the boundary 112 of the bubble 110 at the side of the diaphragm 30 is calculated as a value indicating the position of the bubble 110. The analyzer 60 sequentially analyses the pixel value from the side of the diaphragm 30 to the side of the closed vessel 20 on each line approximately in parallel with the measurement passage 106 on the binary image. Thus, the analyzer 60 obtains each pixel, which has a pixel value changed from 0 to 1, as a boundary pixel located on the boundary 112.

Figure 4:
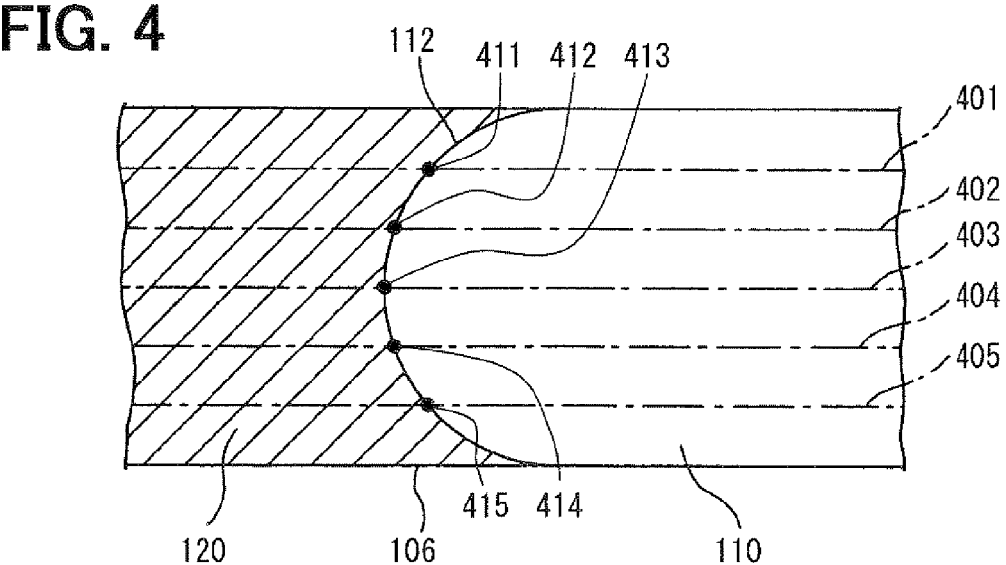
FIG. 4 is a schematic view showing a positioning of the boundary of the bubble.

In the following example shown in FIG. 4, the measurement passage 106 extends in a horizontal direction on the measurement image, and the diaphragm 30 exists at the left on the measurement image. The analyzer 60 sequentially analyses the pixel values of the binary image on each of lines 401 to 405 from the left within the region corresponding to the measurement passage 106. The analyzer 60 assumes pixels 411 to 415, each having the pixel value changed to 1, respectively as the boundary pixels located on the boundary 112. Once the boundary pixels are obtained, the analyzer 60 averages positions of the boundary pixels, and determines an averaged position as the position of the boundary 112. For example, in FIG. 4 the analyzer 60 averages the horizontal coordinates of the boundary pixels 411 to 415, and determines the averaged coordinate as the position of the boundary 112.

The analyzer 60 may obtain the boundary pixels on the boundary 112 directly by performing a difference operation on the measurement image along the measurement passage 106. Moreover, the analyzer 60 may calculate the position of a pixel closest to the diaphragm 30 or the position of a pixel farthest from the diaphragm 30 as the position of the boundary 112, instead of determining the average value of the positions of the boundary pixels as the value of the position of the boundary 112.

At step S105, the analyzer 60 calculates the travel distance of the bubble 110, per unit time such as 1 sec, from the positions of the boundaries 112 obtained from the measurement images. The liquid supply unit 40 pressurizes the test liquid 140 at a specific pressure during the measurement as described before. Therefore, a constant amount of liquid flows from the injector 1 within unit time, when the liquid leaks from the injector 1. Thus, the bubble 110 moves toward the closed vessel 20 at a constant speed.

However, when the liquid measurement apparatus 10 is applied with vibration or environmental change such as change in temperature during the measurement, the position of the bubble 110 may vary to cause a measurement error. Moreover, the shape of the bubble 110 may be changed during the measurement. In such a case, the position of the bubble 110 may be observed in a manner that the bubble 110 is displaced, and consequently the misdetection may cause a measurement error.

Therefore, for example, the analyzer 60 performs a straight-line approximation of the relationship between each of the positions of boundaries 112 obtained from the measurement images and the acquisition time of each measurement image by means of, for example, the least-squares method. Thus, the analyzer 60 calculates the travel distance of the bubble 110 per unit time. That is, the analyzer 60 calculates a slope of the travel distance of the bubble 110 when the travel distance is expressed as a linear function of time. Therefore, even when the position of the bubble 110 varies due to vibration or the like, the liquid measurement apparatus 10 can estimate the position of the bubble so as to minimize an error caused by the variation in position, and consequently the travel distance per unit time of the bubble can be accurately obtained.

In the present embodiment, the measurement images are acquired at a certain time interval, and sequentially transmitted to the analyzer 60 from the oldest measurement image, as described before. Therefore, the analyzer 60 can assume the measurement image, which is first received by the analyzer 60, to be a reference image and determine the acquisition time of each of the measurement images other than the reference measurement image.

Finally, at step S106, the analyzer 60 multiplies the travel distance per unit time of the bubble 110 by the section area of the measurement passage 106, in addition, by a predetermined measurement period such as one minute. Thus, the analyzer 60 calculates the amount of the test liquid 140 flowing from the injector 1. The analyzer 60 instructs to indicate the calculated amount of the liquid on a display device or the like. Furthermore, when the calculated liquid amount is the prescribed amount or more, the analyzer 60 may determine the injector 1 to be a defective product. Alternatively, when the amount of liquid is less than the prescribed amount, the analyzer may determine the injector 1 to be a non-defective product.

Figure 5:
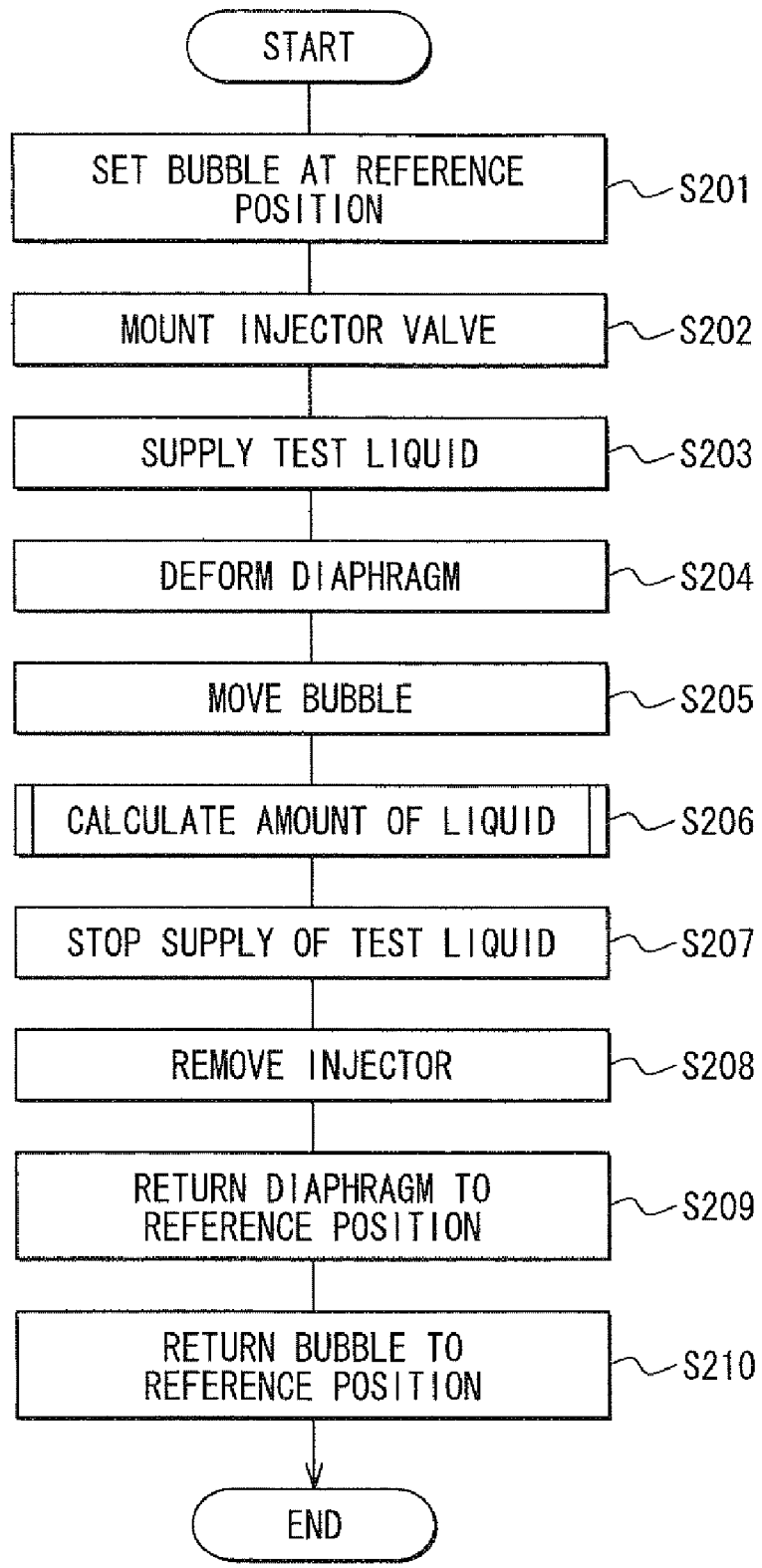
FIG. 5 is a flowchart showing a measurement of an amount of leakage of the injector.

Next, a procedure of measuring the amount of leakage from the injector 1 is described with reference to the flowchart shown in FIG. 5.

(1) First, at step 3201, at the beginning of the measurement, the connecting member 130 of the measurement passage 102 is not connected with any device and opened. In the present condition, the bubble 110 is moved to the reference position given. Thus, pressure applied to the connecting member 130 is equal to the atmospheric pressure. At that time, the diaphragm 30 is held on the passage member 12 as described before.

(2) Next, at step S202, the injector 1 being an inspected object is connected to the connecting member 130, and then mounted on the liquid measurement apparatus 10 while the valve of the injector is closed.

(3) At step S203, when the injector 1 is mounted, the liquid supply unit 40 starts supply of the test liquid 140 into the injector 1. The liquid supply unit 40 pressurizes the test liquid 140 at a specific pressure during the supplying of the test liquid 140.

(4) At step S204, when the test liquid 140 leaks from the injector 1, the test liquid 140 flowing from the injector 1 induces deformation in the diaphragm 30. That is, as the amount of the test liquid 140 flowing from the injector 1 into the measurement passage 102 increases, the diaphragm 30 is increasingly curved toward the measurement passage 104, so that the volume inside of the measurement passage 104 is decreased by the volume corresponding to the increasing amount of the test liquid 140.

(5) At step S205, as the diaphragm 30 increasingly deforms, the high-boiling liquid 120 in the measurement passage 104 gradually moves toward the measurement passage 106, therefore the bubble 110 injected in the measurement passage 106 also gradually moves toward the closed vessel 20.

(6) Once the supply of the test liquid 140 is started, the camera 50 immediately starts acquisition of the measurement images by photographing the bubble 110. Then, the camera 50 acquires the measurement images at the predetermined time interval, for example, an interval of 100 msec, and transmits the measurement images to the analyzer 60. At step S206, the analyzer 60 calculates the travel distance of the bubble 110 per unit time based on the measurement images. Furthermore, the analyzer 60 calculates the amount of liquid leakage from the injector 1 per predetermined time based on the travel distance. In addition, the analyzer 60 instructs to indicate the amount of liquid leakage, an acceptance determination result, and the like on the display device or the like. The acceptance determination result indicates the injector 1 to be one of a defective product and a non-defective product. The detail of the travel distance of the bubble 110 per unit time and the detail of the calculation of the amount of liquid leaking from the injector 1 are as described before.

(7) After the measurement time for the inspection has passed, at step S207, the supply of the test liquid 140 from the liquid supply unit 40 into the injector 1 is terminated.

(8) At step S208, the injector 1 is removed from the connecting member 130 of the passage member 12. At step S209, the diaphragm 30 is returned to the reference position and held on the end face of the passage member 12, since the pressure applied to the measurement passage 102 is thus returned to the atmospheric pressure. At step S210, when the diaphragm 30 is returned to the reference position, the bubble 110 is also returned to the reference position in the measurement passage 106 in the passage member 16.

The procedure of steps S201 to S210 is repeated when another injector 1 is inspected.

As described above, in the liquid measurement apparatus 10 according to the present embodiment, the open end of the measurement passage 106 being injected with the bubble 110 is connected to the closed vessel 20, and the inside of the closed vessel 20 is filled with saturated vapor of the liquid being filled in the measurement passages 104 and 106. Furthermore, the measurement passage 100 is partitioned by the diaphragm 30, and the high-boiling liquid 120, which is hard to vaporize at a measurement environment, is used for the liquid filling the measurement passages 104 and 106. According to such a configuration, shift of the bubble 110 due to vaporization of the liquid filling the measurement passages 104 and 106 can be suppressed in the liquid measurement apparatus 10, Consequently, even if maintenance operation such as re-injection of the liquid and the bubble into the measurement passages 104 and 106 is not carried out over a long period, the liquid measurement apparatus 10 can be used.

Moreover, the liquid measurement apparatus 10 analyzes the measurement image, which is obtained by photographing the bubble 110, to analyze the configuration of the boundary. Whereby, the apparatus 10 can find a cause of degrading measurement accuracy such as mixing of a foreign substance into the measurement passage 106. Thus, the apparatus 10 can issue warning on such degradation, and therefore erroneous measurement can be restricted.

Furthermore, the liquid measurement apparatus 10 performs a linear approximation of the relationship between the travel distance of the bubble and the time based on the measurement images. Thus, the measurement apparatus can accurately calculate the travel distance of the bubble per unit time. Therefore, the measurement apparatus can accurately measure the amount of liquid flowing from the injector 1.

The above structure and method are not limitedly applied to measurement of the amount of liquid leaking from the injector, but can be applied to measurement of amount of leaking from a flow-rate control valve for controlling a flow-rate of another liquid. Moreover, the invention is not limitedly used for measurement of the amount of liquid leakage, but can be used for measuring a small amount of liquid flowing from a measured object.

Furthermore, in the present embodiment, the inside of the closed vessel 20 may be filled with saturated vapor of the test liquid 140 so as to fill the measurement passages 102, 104 and 106 with the same test liquid 140. In this case, the diaphragm 30 may be omitted. Alternatively, the measurement passages 104 and 106 may be filled with the high-boiling liquid 120 that does not vaporize at the measurement environment as described before, and the measurement passage 106 may be opened to the atmosphere at one end while the closed vessel 20 is removed.

While air is used to form the bubble 110 in the present embodiment, the bubble 110 may be formed by using another gas that is hardly soluble in the liquid filling the measurement passages 104 and 106.

Furthermore, the measurement passage 102 may be branched halfway such that an open passage opened to the atmosphere and an opening/closing valve for opening and closing the open passage are provided. Pressure applied to the diaphragm 30 can be adjusted by using such a configuration, so that a position of the bubble 110 in the measurement passage 106 can be adjusted at the beginning of the measurement.

The above processings such as calculations and determinations are not limited being executed by the ECU 20. The control unit may have various structures including the ECU 20 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A liquid measurement apparatus for measuring an amount of liquid flowing from a measured object, the liquid measurement apparatus comprising:
   a passage member having a measurement passage being connected to the measured object at one end, the measurement passage being filled with liquid;
   a closed vessel connected to an other end of the measurement passage and filled with saturated vapor of the liquid; and
   an analyzer,
   wherein the liquid filled in the measurement passage contains a bubble, which is movable in accordance with change in amount of the liquid in the measurement passage, and
   the analyzer is configured to calculate a travel distance of the bubble and configured to measure the amount of the liquid flowing from the measured object based on the calculated travel distance.

2. The liquid measurement apparatus according to claim 1, further comprising:
   a camera configured to successively photograph the bubble to obtain a plurality of measured images,
   wherein the analyzer is configured to obtain positions of the bubble respectively on the plurality of measured images, and
   the analyzer is configured to calculate the travel distance based on the positions of the bubble.

3. The liquid measurement apparatus according to claim 2,
   wherein the analyzer is configured to obtain the positions of the bubble on at least three of the plurality of measured images, and
   the analyzer is configured to perform a linear approximation of a relationship between elapsed time and the travel distance from the obtained positions of the bubble and calculate a unit-time travel distance of the bubble per unit time.

4. The liquid measurement apparatus according to claim 2,
   wherein the analyzer is configured to obtain a boundary of the bubble on each of the plurality of measured images, and the analyzer is configured to compare the obtained boundary with a normal boundary of a normal bubble thereby to determine whether the bubble on each measured image is normal.

5. A liquid measurement apparatus for measuring an amount of liquid flowing from a measured object, the liquid measurement apparatus comprising:
  a passage member having a measurement passage being connected to the measured object at one end;
  a diaphragm provided in the measurement passage to partition the measurement passage into a measured-object side passage and an observation passage, the measured-object side passage being connected with the measured object and filled with test liquid, the diaphragm being configured to change in shape in accordance with change in amount of the test liquid in the measured-object side passage; and
  an analyzer,
  wherein the observation passage is filled with high-boiling liquid, which is substantially non-vaporizing at a measurement environment and contains a bubble, which is movable in the observation passage in accordance with change in shape of the diaphragm, and
  the analyzer is configured to calculate a travel distance of the bubble configured to and measure the amount of liquid flowing from the measured object based on the travel distance.

6. The liquid measurement apparatus according to claim 5, wherein the high-boiling liquid is silicone oil.

7. The liquid measurement apparatus according to claim 5, further comprising:
  a camera configured to successively photograph the bubble to obtain a plurality of measured images,
  wherein the analyzer is configured to obtain positions of the bubble respectively on the plurality of measured images, and
  the analyzer is configured to calculate the travel distance based on the positions of the bubble.

8. The liquid measurement apparatus according to claim 7,
  wherein the analyzer is configured to obtain positions of the bubble on at least three of the plurality of measured images, and
  the analyzer is configured to perform a linear approximation of a relationship between elapsed time and the travel distance of the bubble from the obtained positions of the bubble thereby to calculate a unit-time travel distance of the bubble per unit time.

9. The liquid measurement apparatus according to claim 7,
  wherein the analyzer is configured to obtain a boundary of a bubble on each of the plurality of measured images, and the analyzer is configured to compare the obtained boundary with a normal boundary of a normal bubble thereby to determine whether the bubble on each measured image is normal.

10. A liquid measurement apparatus for measuring the amount of liquid flowing from a measured object, the liquid measurement apparatus comprising:
  a passage member having a measurement passage being connected to the measured object at one end, the measurement passage being filled with liquid;
  a closed vessel connected to an other end of the measurement passage and filled with saturated vapor of the liquid; and
  a camera configured to successively photograph the measurement passage to obtain at least three measured images; and
  an analyzer,
  wherein the liquid filled in the measurement passage contains a bubble, which is movable in the measurement passage in accordance with a change in the amount of liquid in the measurement passage,
  the analyzer is configured to obtain positions of the bubble on at least three of measured images,
  the analyzer is configured to perform a linear approximation of a relationship between elapsed time and the travel distance of the bubble from the obtained positions of the bubble to calculate a unit time travel distance of the bubble per unit time, and
  the analyzer is configured to measure the amount of liquid flowing from the measured object in a predetermined period based on the travel distance mer unit time.

11. A method for measuring an amount of liquid flowing from a measured object, the method comprising:
  obtaining at least three measured images by photographing a bubble, which is contained in a liquid filled in a measurement passage, the measurement passage being connected to the measurement object at one end, and connected to a closed vessel filled with saturated vapor of the liquid at the other end, the bubble being movable in the measurement passage in accordance with a change in the amount of liquid in the measurement passage;
  calculating the positions of the bubble on the at least three measured images, and
  performing a linear approximation of a relationship between elapsed time and a travel distance of the bubble from the positions of the bubble thereby to calculate a travel distance of the bubble per unit time.

12. The method according to claim 11 further comprising:
  obtaining a boundary of the bubble on each of the at least three measured images; and
  comparing the obtained boundary with a normal boundary of a normal bubble thereby to determine whether the bubble on each measured image is normal.

* * * * *